Patented May 4, 1937

2,079,415

UNITED STATES PATENT OFFICE 2,079,415

PROCESS OF PREPARING DECOLORIZED FLAVORING MATERIAL FROM NATURALLY COLORED VEGETABLE SUBSTANCES

Arthur A. Levinson, Chicago, Ill., assignor to Wm. J. Strange Co., Chicago, Ill., a corporation of Illinois No Drawing. Application October 5, 1934, Serial No. 747,038

10 Claims. (Cl. 87—28)

This invention relates to a process of preparing decolorized flavoring material from naturally colored vegetable substances and to the product so obtained. In particular, the present invention relates to a process of extracting from black pepper the flavoring materials, oleo-resins, essential oils and the like, free from natural color bodies such as chlorophyll.

It has heretofore been customary to use black pepper as such in its ground state but owing to the undesirable color of black pepper for many purposes, its use for such purposes has been largely replaced by white pepper or decorticated pepper. Black pepper has, however, a flavor that is far richer and therefore more highly valued than the flavor of white pepper or decorticated pepper.

I have now found that the natural flavoring substances, oleo-resins, essential oils and the like of vegetable materials containing chlorophyll may be removed from such vegetable materials and obtained in a decolorized condition, free from chlorophyll. In the case of black peper, my present invention makes it possible to obtain a product having all of the natural flavoring qualities of black pepper but in a decolorized state, free from chlorophyll, and soluble in practically all food preparations in which it might be used.

It is therefore an important object of this invention to provide a process for producing from vegetable spices and the like containing chlorophyll, a product having the flavoring qualities of the vegetable material but substantially free from chlorophyll.

It is a further important object of this invention to provide a process for producing from black pepper a product which has in all respects the flavor of black pepper but which is free from any considerable depth of color and therefore possesses in that respect the advantages of white pepper.

It is a further object of this invention to provide a method of extracting from black pepper the flavoring material, including oleo-resins, essential oils and the like, and of obtaining these flavoring materials in a substantially decolorized condition, free from chlorophyll, and soluble in most products with which the flavoring materials may be used.

It is a further important object of this invention to provide oleo-resinous materials having highly desirable flavoring qualities and substantially free from chlorophyll bodies, where heretofore such oleo-resinous materials have existed in nature only in combination with chlorophyll.

Other and further important objects of this invention will become apparent from the following description and appended claims.

The process of this invention applies to all vegetable materials, spices and the like, having naturally occurring chlorophyll. Among such vegetable materials may be mentioned black pepper, sage, marjoram, thyme, parsley, caraway and others. The invention will, however, be particularly described in connection with a process for extracting flavoring substances from black pepper.

My process comprises extracting the oleo-resins, essential oils and other flavoring materials from black pepper with the use of a selective solvent for chlorophyll to remove color bodies from the solution of the flavoring material. According to my invention, black pepper is first extracted with an organic solvent capable of dissolving the oleo-resins, essential oils, chlorophyll and the like. The solvent may then be evaporated from the solution so formed, and the solids redissolved, or the first solution, if made with a water immiscible solvent, may be treated directly with a solvent that is slightly miscible with the solution and that is also a selective solvent for chlorophyll and miscible with water. In either case, water is added to effect a separation of the liquid mass into layers, comprising an organic solvent layer containing the oleo-resins etc., and an aqueous layer containing the chlorophyll. The layer containing the aqueous solution of chlorophyll is removed and the organic solvent layer evaporated to recover the flavoring ingredients, oleo-resins and others.

The following example will serve to illustrate a preferred embodiment of my invention, without constituting a limitation upon the scope of my invention:

Finely ground black pepper is extracted by means of alcohol, ether, ethylene dichloride or any suitable organic solvent. The extraction may be carried out in any suitable type of extraction apparatus. The resulting solution is then completely evaporated under vacuum to remove the solvent from the oleo-resinous matter that has been extracted from the black pepper.

The oleo-resinous matter is then redissolved in a solvent, such as ethyl ether, isopropyl ether, ethylene dichloride, or any solvent that is immiscible with water and that has a dissolving action toward the oleo-resinous matter. Preferably, the resulting solution is made up to a concentration of about 5 to 10% of solids by weight, since this has been found to be the proper concentration at which to conduct the following extraction.

An alcoholic caustic solution is then prepared by dissolving a saturated aqueous solution of caustic soda or caustic potash in methyl alcohol, or any other water soluble alcohol, such as ethyl, isopropyl and others. Preferably the alcoholic caustic solution is made up to a strength such that it contains 10% by weight of caustic soda or caustic potash. To each 1000 c. c. of the green oleo-resin solution obtained in the first extraction step, or by redissolving, there are added approximately 250 c. c. of the alcoholic caustic solution and the mixture allowed to stand for approximately 5 minutes.

After the mixture has stood approximately 5 minutes in the cold, so as to avoid any possibility of saponification of any ingredients that might be capable of reacting with an alkaline solution, approximately 1000 to 2000 c. c. of water are added to the mixture. The mixture is then slightly shaken, or agitated, and thereafter allowed to separate into layers.

Where a solvent lighter than water has been used, the water solution sinks to the bottom of the container and carries with it the chlorophyll, or coloring bodies. The bottom aqueous layer also contains the water soluble alcohol and alkali that were used. The upper layer is then removed from the lower layer and the solvents evaporated, whereupon an oleo-resinous material remains, which contains all of the essential oil, all of the resins, all of the piperine, and all of the carotin and xantophyll, but does not contain any of the green coloring matters which are the chlorophyll bodies.

If a solvent is used which is heavier than water, the aqueous layer will constitute the upper layer and the lower non-aqueous solvent layer will contain the oleo-resin. The non-aqueous solvent layer, in this case, will be withdrawn from the bottom rather than from the top.

The oleo-resinous material thus obtained is substantially free from color, except a slight yellow coloring imparted to it by carotin and xantophyll. This yellow coloring does not prevent the use of the oleo-resinous materials for any purposes to which it is desired to put them.

The oleo-resinous material may be mixed with any known ingredients, either water soluble, such as sugar, salt, milk sugar, and the like; or ingredients partially water soluble and partially insoluble, such as soya bean flour, starches, and other flours; or the oleo-resinous material may be mixed with inert materials, or with white pepper to form a more concentrated product.

It will thus be seen that my invention provides a process, the first step of which comprises the extraction of the complete flavoring material of black pepper, and other vegetable substances, by a solvent for the oelo-resins, essential oils, piperine, carotin and chlorophyll. The solution so produced is evaporated to remove this solvent and produce an oleo-resinous material which contains all of the flavoring materials of black pepper together with all of its coloring ingredients. The colored oleo-resinous materials are then redissolved in a solvent that is immiscible with water.

Alternatively, the oleo-resinous materials may be initially extracted from black pepper by means of a solvent that is immiscible with water but that is capable of dissolving the oleo-resins, essential oils, chlorophyll and other ingredients. In that case it is not necessary to remove all of the solvents by evaporation but the resulting solution may be treated the same as the solution prepared by redissolving the oleo-resinous material, as follows.

The second step consists of treating the solution of oleo-resinous material including chlorophyll, dissolved in a solvent that is immiscible with water, with a solubilizing agent for the chlorophyll content, the solubilizing agent being a water miscible solvent that is also somewhat miscible with the solvent of the oleo-resinous material solution. After the solubilizing action on the chlorophyll has taken place, water is added to the solution to selectively remove the chlorophyll coloring matters. Owing to differences in specific gravity, a separation of layers takes place between the solution of the oleo-resinous materials and the aqueous solution of chlorophyll bodies, whereby the layer containing the oleo-resinous materials may be isolated and evaporated to recover the oleo-resins and associated ingredients.

The solvents used in the process just described may be divided into three groups, as follows: group A, solvents of an organic type, either miscible or immiscible with water and having a dissolving action toward the oleo-resins, resins, essential oils, carotin, xantophyll and piperine of the black pepper or other vegetable materials to be extracted:

Alcohols, such as methyl, ethyl and the like.
Ethers, such as ethyl, propyl, isopropyl ether and the like.
Halogenated hydrocarbons of the type of ethylene dichloride.

Group B, solvents of an organic type that are immiscible in water and that have a dissolving action toward the oleo-resins, resins, essential oils, chlorophyll, carotin, xantophyll and piperine of the vegetable substance being extracted:

Ethers, as above.
Halogenated hydrocarbons, as above.

Group C, water soluble solvents having an alkaline reaction and capable of selectively solubilizing chlorophyll for extraction in an aqueous solution:

Alcoholic caustic solutions.
Alkaline solutions of water soluble glycols, such as ethylene glycol and the like.
Aqueous caustic alkali solutions.

It will be understood that the steps of my process may be modified considerably and still be within the concept of my invention. For instance, in the last step, the solid mixture of oleo-resins, resins, essential oils, chlorophyll, carotin, xantophyll and piperine may be first treated with an alcoholic caustic solution to solubilize the chlorophyll, then ether, or other group B solvent added, and the mass diluted with water to effect the separation into two layers. The rest of the process would then be carried out as described above.

The oleo-resinous material obtained by extraction in accordance with my invention possesses all of the desirable features of the original vegetable material without any objectionable color. Where the extraction is made from black pepper, the final product has the flavoring properties of black pepper and in addition is soluble in practically all preparations with which it might be used to advantage. The product comprises essential oils, which carry most of the flavoring of the black pepper; resinous materials, which carry some flavoring material together with a fixative intended to hold the flavor so that it is not easily dissipated; and piperine, which is the ingredient in pepper that gives the sensation of burning or heat. There is thus produced a product from black pepper that is practically colorless or of an unobjectionable yellowish color, which at the same time possesses the superior flavoring quality of black pepper.

I am aware that numerous details of the process may be varied through a wide range without departing from the principles of this invention, and I therefore, do not purpose limiting the patent granted hereon otherwise than necessitated by the prior art.

I claim as my invention:

1. The process of preparing a decolorized edible oleo-resinous material from black pepper containing oleo-resins, essential oils and chlorophyll which comprises extracting the oleo-resins, essential oils and chlorophyll and forming a solution thereof in a water immiscible organic solvent neutral to said oleo-resins, essential oils and chlorophyll, adding to said solution in the cold and without agitation an alcoholic caustic alkali solution of not over substantially 10% strength, subsequently diluting the resulting mass with water and agitating, allowing the mass to separate into layers and separating the solution layer containing the oleo-resins and essential oils from the aqueous layer containing chlorophyll.

2. The process of preparing a decolorized edible oleo-resinous material from vegetable materials containing oleo-resins, essential oils and chlorophyll, which comprises extracting the oleo-resins, essential oils and chlorophyll, forming a solution of said oleo-resins, essential oils and chlorophyll in a water immiscible organic solvent neutral to said oleo-resins, essential oils and chlorophyll, adding to said solution a water miscible alkali solution that is partly miscible with the solvent of the solution, diluting to an alkaline concentration of less than 10%, agitating the combined solution and solvent with water, and allowing the resulting mass to stand to effect separation of a solution layer containing the oleo-resins and essential oils from an aqueous layer containing chlorophyll.

3. The process of preparing a decolorized edible oleo-resinous material from vegetable materials containing oleo-resins, essential oils and chlorophyll which comprises forming a solution of said oleo-resins, essential oils and chlorophyll in a water immiscible organic solvent neutral to said oleo-resins, essential oils and chlorophyll, adding to said solution a water miscible caustic alkali solution that is partly miscible with the organic solvent of said solution, diluting and agitating the combined solution and solvent with water to an alkaline concentration of less than 10%, maintaining the combined solution and solvent cold, allowing the resulting mass to stand to cause separation of a solution layer containing oleo-resins and essential oils from an aqueous layer containing chlorophyll, separating said aqueous layer and evaporating the remaining solution to obtain the oleo-resins and essential oils.

4. The process of preparing a decolorized edible oleo-resinous material from black pepper containing oleo-resins, essential oils and chlorophyll, which comprises extracting the oleo-resins, essential oils and chlorophyll, forming a solution thereof in a water immiscible organic solvent neutral to said oleo-resins, essential oils and chlorophyll, adding to said solution a caustic alkali solution that is water miscible and partly miscible with the organic solvent of said solution, diluting and agitating the combined solution and solvent with water in the cold to an alkaline concentration of less than 10% and allowing the resulting mass to stand to cause separation of a solution layer containing oleo-resins from an aqueous layer containing chlorophyll.

5. The process of preparing a decolorized edible oleo-resinous material from black pepper containing oleo-resins, essential oils and chlorophyll, which comprises extracting the oleo-resins, essential oils and chlorophyll forming a solution of said oleo-resins, essential oils and chlorophyll in a water immiscible organic solvent neutral for said material, adding to said solution an alkaline solvent which is a selective solvent for chlorophyll and which is water miscible and partly miscible with the solvent of said solution, diluting and agitating the combined solution and solvent with water in the cold to an alkaline concentration of less than 10%, allowing the resulting mass to stand to cause a separation of a solution layer containing oleo-resins and essential oils from an aqueous layer containing chlorophyll, separating said aqueous layer and evaporating the remaining solution to obtain the oleo-resins and essential oils of said black pepper.

6. The process of preparing a decolorized edible oleo-resinous material from vegetable materials containing oleo-resins, essential oils and chlorophyll which comprises extracting the oleo-resins, essential oils and chlorophyll, forming a solution of said oleo-resins, essential oils and chlorophyll in a water immiscible organic solvent neutral to said oleo-resins, essential oils and chlorophyll, adding to said solution an aqueous caustic alkali solution, diluting and agitating the combined solution and solvent with water in the cold to an alkaline concentration of less than 10% and allowing the resulting mass to stand to cause separation of a solution layer containing oleo-resins and essential oils from an aqueous layer containing chlorophyll.

7. The process of preparing a decolorized edible oleo-resinous material from vegetable materials containing oleo-resins, essential oils and chlorophyll which comprises extracting the oleo-resins, essential oils and chlorophyll, forming a solution of said oleo-resins, essential oils and chlorophyll in a water immiscible organic solvent neutral to said oleo-resins, essential oils and chlorophyll, adding to said solution an alcoholic caustic alkali solution without agitation, diluting and agitating the combined solution and solvent with water in the cold to an alkaline concentration of less than 10% and allowing the resulting mass to stand to cause separation of a solution layer containing oleo-resins and essential oils from an aqueous layer containing chlorophyll.

8. The process of preparing a decolorized, edible oleo-resinous flavoring material from vegetable substances containing oleo-resins, essential oils and chlorophyll which comprises extracting said vegetable substances with an organic solvent for the oleo-resins, essential oils and chlorophyll, evaporating the resulting solution, re-dissolving the oleo-resins, essential oils and chlorophyll in an organic solvent that is water immiscible and neutral to said oleo-resins, essential oils and chlorophyll, adding to the resulting solution an alcoholic caustic alkali solution without substantial agitation, diluting and agitating the mass so obtained with a relatively large proportion of water to an alkaline concentration of materially less than 10%, allowing the diluted mass to separate into layers, separating an aqueous layer from a non-aqueous layer and evaporating the non-aqueous layer to obtain the oleo-resins and essential oils contained therein.

9. The process of preparing a decolorized, edible, oleo-resinous flavoring material from black pepper containing oleo-resins, essential oils and chlorophyll which comprises extracting said black pepper with an organic solvent for the oleo-resins, essential oils and chlorophyll, evaporating the resulting solution, redissolving said oleo-resins, essential oils and chlorophyll in a water immiscible organic solvent neutral to said oleo-resins, essential oils and chlorophyll, adding to the resulting solution a relatively dilute alcoholic caustic solution of not over 10% alkaline concentration, diluting and agitating the mass so obtained with a relatively large proportion of water, allowing the diluted mass to separate into layers, separating an aqueous layer from a non-aqueous layer and evaporating said non-aqueous layer to obtain the oleo-resins and essential oils contained therein.

10. The process of preparing a decolorized, edible oleo-resinous material from vegetable materials containing oleo-resins, essential oils and chlorophyll which comprises extracting the oleo-resins, essential oils and chlorophyll and forming a solution thereof in a solvent selected from the group consisting of ethyl ether, propyl ether, isopropyl ether and ethylene dichloride, adding to said solution a solvent for chlorophyll selected from the group consisting of alcoholic caustic solutions, alkaline solutions of water soluble glycols and aqueous caustic alkali solutions in concentrations of not substantially over 10%, diluting and agitating the combined solution and solvent in the cold with water, and allowing the resulting mass to stand to cause separation of a solution layer containing oleo-resins from an aqueous layer containing chlorophyll.

ARTHUR A. LEVINSON.

CERTIFICATE OF CORRECTION.

Patent No. 2,079,415.                                              May 4, 1937.

ARTHUR A. LEVINSON.

It is hereby certified that the name of the assignee in the above numbered patent was erroneously written and printed as "Wm. J. Strange Co." whereas said name should have been written and printed as Wm. J. Stange Co., as shown by the record of assignments in this office; and that the said Letters Patent should be read with this correction therein that the same may conform to the record of the case in the Patent Office.

Signed and sealed this 6th day of July, A. D. 1937.

Henry Van Arsdale (Seal)                                          Acting Commissioner of Patents.

water to an alkaline concentration of materially less than 10%, allowing the diluted mass to separate into layers, separating an aqueous layer from a non-aqueous layer and evaporating the non-aqueous layer to obtain the oleo-resins and essential oils contained therein.

9. The process of preparing a decolorized, edible, oleo-resinous flavoring material from black pepper containing oleo-resins, essential oils and chlorophyll which comprises extracting said black pepper with an organic solvent for the oleo-resins, essential oils and chlorophyll, evaporating the resulting solution, redissolving said oleo-resins, essential oils and chlorophyll in a water immiscible organic solvent neutral to said oleo-resins, essential oils and chlorophyll, adding to the resulting solution a relatively dilute alcoholic caustic solution of not over 10% alkaline concentration, diluting and agitating the mass so obtained with a relatively large proportion of water, allowing the diluted mass to separate into layers, separating an aqueous layer from a non-aqueous layer and evaporating said non-aqueous layer to obtain the oleo-resins and essential oils contained therein.

10. The process of preparing a decolorized, edible oleo-resinous material from vegetable materials containing oleo-resins, essential oils and chlorophyll which comprises extracting the oleo-resins, essential oils and chlorophyll and forming a solution thereof in a solvent selected from the group consisting of ethyl ether, propyl ether, iso-propyl ether and ethylene dichloride, adding to said solution a solvent for chlorophyll selected from the group consisting of alcoholic caustic solutions, alkaline solutions of water soluble glycols and aqueous caustic alkali solutions in concentrations of not substantially over 10%, diluting and agitating the combined solution and solvent in the cold with water, and allowing the resulting mass to stand to cause separation of a solution layer containing oleo-resins from an aqueous layer containing chlorophyll.

ARTHUR A. LEVINSON.

CERTIFICATE OF CORRECTION.

Patent No. 2,079,415.  May 4, 1937.

ARTHUR A. LEVINSON.

It is hereby certified that the name of the assignee in the above numbered patent was erroneously written and printed as "Wm. J. Strange Co." whereas said name should have been written and printed as Wm. J. Stange Co., as shown by the record of assignments in this office; and that the said Letters Patent should be read with this correction therein that the same may conform to the record of the case in the Patent Office.

Signed and sealed this 6th day of July, A. D. 1937.

Henry Van Arsdale (Seal)  Acting Commissioner of Patents.

CERTIFICATE OF CORRECTION.

Patent No. 2,079,415.   May 4, 1937.

ARTHUR A. LEVINSON.

It is hereby certified that the name of the assignee in the above numbered patent was erroneously written and printed as "Wm. J. Strange Co." whereas said name should have been written and printed as Wm. J. Stange Co., as shown by the record of assignments in this office; and that the said Letters Patent should be read with this correction therein that the same may conform to the record of the case in the Patent Office.
Signed and sealed this 6th day of July, A. D. 1937.

Henry Van Arsdale (Seal)   Acting Commissioner of Patents.